(12) United States Patent
Iwata (10) Patent No.: US 11,155,125 B2
(45) Date of Patent: Oct. 26, 2021

(54) PNEUMATIC TYRE

(71) Applicant: Sumitomo Rubber Industries, Ltd., Hyogo (JP)

(72) Inventor: Yasutaka Iwata, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 232 days.

(21) Appl. No.: 16/424,519

(22) Filed: May 29, 2019

(65) Prior Publication Data

US 2020/0016940 A1 Jan. 16, 2020

(30) Foreign Application Priority Data

Jun. 21, 2018 (JP) .............................. JP2018-118072

(51) Int. Cl.
*B60C 13/02* (2006.01)

(52) U.S. Cl.
CPC .......... *B60C 13/02* (2013.01); *B60C 2200/14* (2013.01)

(58) Field of Classification Search
CPC ... B60C 11/01; B60C 2011/013; B60C 13/00; B60C 13/001; B60C 13/002; B60C 13/02; B60C 13/023
See application file for complete search history.

(56) References Cited

FOREIGN PATENT DOCUMENTS

| JP | 2012-86756 | * | 5/2012 |
| JP | 2016-055820 A | | 4/2016 |

OTHER PUBLICATIONS

Machine translation of JP 2012-86756, 2012.*

* cited by examiner

*Primary Examiner* — Justin R Fischer
(74) *Attorney, Agent, or Firm* — Studebaker & Brackett PC (57) ABSTRACT

A pneumatic tyre includes a tread portion having a pair of tread edges, and a pair of buttress portions each extending inwardly in a tyre radial direction from a respective one of the tread edges. At least one of the pair of buttress portions is provided with side protectors protruding outwardly in a tyre axial direction from an outer surface of the at least one of the pair of buttress portions and being arranged in a lyre circumferential direction. At least one of the side protectors is provided with one or more inclined grooves inclined with respect to the tyre circumferential direction. The inclined grooves include one or more ribbed inclined grooves which have groove bottoms provided with a set of plurality of first ribs.

19 Claims, 6 Drawing Sheets

PNEUMATIC TYRE

BACKGROUND ART

Field of the Disclosure

The present disclosure relates to a pneumatic tyre including a buttress portion whose outer surface is provided with a plurality of side protectors arranged in the tyre circumferential direction.

Description of the Related Art

Pneumatic tyres for traveling on off-road terrain generally include buttress portions whose outer surfaces are provided with a plurality of side protectors arranged in the tyre circumferential direction (see Patent document 1, for example). The side protectors, when traveling on off-road terrain, can prevent tyre sidewalls from receiving cut damage by being hit sharp stones and the like. Further, when tyres travel in mud terrain, gaps (recesses) between adjacent side protectors can shear mud so as to increase traction in mud terrain.
[Patent document]
[Patent document 1] JP2016-55820A1

SUMMARY OF THE DISCLOSURE

Unfortunately, side protectors tend to provide a larger rubber thickness on buttress portions, thus enhancing sidewall stiffness (especially, stiffness in the tyre radial direction) of the tyre, leading to problem of deterioration of ride comfort.

The present disclosure has been made in view of the above circumstances and has a major object to provide a pneumatic tyre with a buttress portion provided with a plurality of side protectors capable of improving ride comfort while maintaining cut resistance.

According to one aspect of the disclosure, a pneumatic tyre includes a tread portion having a pair of tread edges, and a pair of buttress portions each extending inwardly in a tyre radial direction from a respective one of the tread edges. At least one of the pair of buttress portions is provided with side protectors protruding outwardly in a tyre axial direction from an outer surface of the at least one of the pair of buttress portions and being arranged in a tyre circumferential direction. At least one of the side protectors is provided with one or more inclined grooves inclined with respect to the tyre circumferential direction. The inclined grooves include one or more ribbed inclined grooves which have groove bottoms provided with a set of plurality of first ribs.

In another aspect of the disclosure, the ribbed inclined grooves may have angles θ1 of from 20 to 40 degrees with respect to the tyre circumferential direction.

In another aspect of the disclosure, in the ribbed inclined grooves, a protruding height of the plurality of first ribs may be in a range of from 0.5 to 3.0 mm from the groove bottoms, a rib width of the plurality of first ribs perpendicular to longitudinal direction thereof may be in a range of from 0.5 to 2.5 mm, and a pitch of the plurality of first ribs may be in a range of from 1.5 to 5.5 mm.

In another aspect of the disclosure, the ribbed inclined grooves each may have a pair of groove walls, and the plurality of first ribs may connect the pair of groove walls.

In another aspect of the disclosure, in a cross-section of each ribbed inclined groove perpendicular to a longitudinal direction thereof, the ribbed inclined groove may have a pair of groove walls which is inclined at an angle of from 20 to 60 degrees with respect to a normal line of an outer surface of the at least one of the side protectors.

In another aspect of the disclosure, the inclined grooves may include a first inclined groove and a second inclined groove which are different in inclination direction with respect to the tyre circumferential direction with each other, and at least the first inclined groove may be one of the ribbed inclined grooves.

In another aspect of the disclosure, the second inclined groove may have no ribs in a groove bottom thereof.

In another aspect of the disclosure, an outer end in the tyre radial direction of the first inclined groove may be connected to a middle portion in a longitudinal direction of the second inclined groove so as to form a T-shaped junction.

In another aspect of the disclosure, the outer surface of the at least one of the pair of buttress portions may further be provided with a plurality of second ribs connecting side protectors arranged adjacently in the tyre circumferential direction, and the plurality of second ribs may be inclined in a same direction as the first ribs with respect to the tyre circumferential direction.

DESCRIPTION OF THE PREFERRED EMBODIMENTS

An embodiment of the present disclosure will be explained below with reference to the accompanying drawings.

Figure 1:
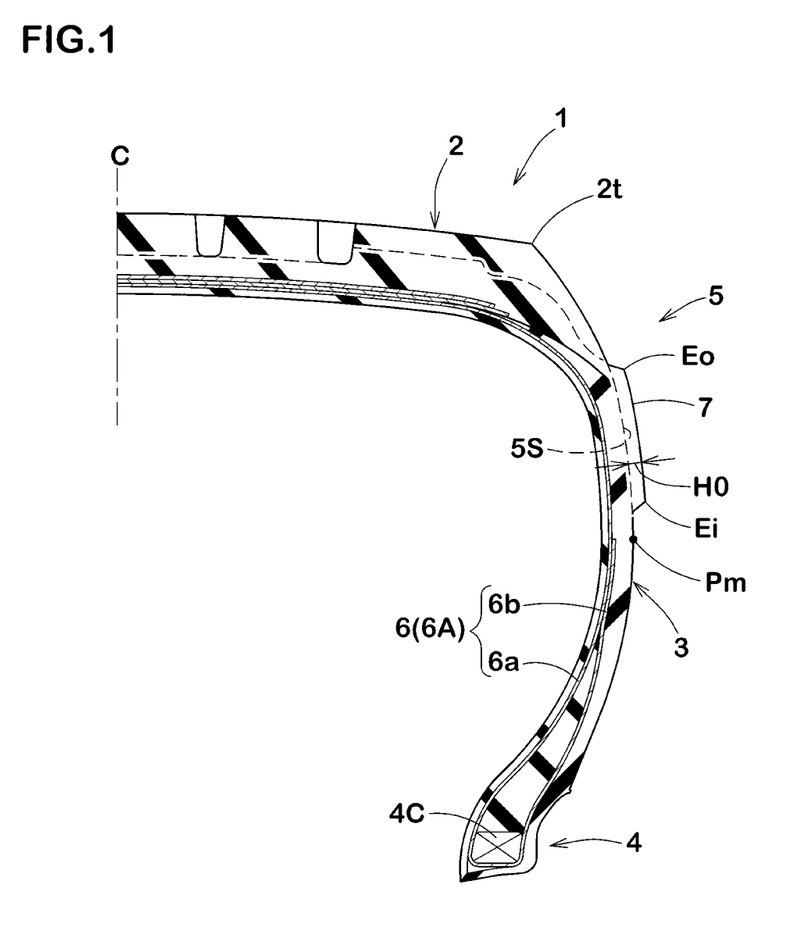
FIG. 1 is a cross-sectional view of a pneumatic tyre according to an embodiment of the disclosure.

FIG. 1 illustrates a cross-sectional view of the right half portion of a pneumatic tyre (hereinafter, simply referred to as "tyre") 1 including a tyre axis (not illustrated) under a normal state in accordance with an embodiment of the disclosure.

In this embodiment, as a preferred aspect, an all-season tyre for four-wheel-drive vehicle is illustrated.

Note that needless to say the present disclosure can be used for tyres belonging to other categories, e.g., for light-truck and heavy-duty vehicle use.

As used herein, the normal state is such that the tyre 1 is mounted on a standard wheel rim (not illustrated) with a standard pressure but is loaded with no tyre load.

As used herein, dimensions of respective portions of the tyre 1 are values measured under the normal state unless otherwise noted.

The standard wheel rim is a wheel rim officially approved for each tyre by standards organizations on which the tyre 1 is based, wherein the standard wheel rim is the "standard rim" specified in JATMA, the "Design Rim" in TRA, and the "Measuring Rim" in ETRTO, for example.

The standard pressure is a standard pressure officially approved for each tyre by standards organizations on which the tyre 1 is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example.

The tyre 1 according to the embodiment includes a toroidal carcass 6 extending between bead cores 4C disposed in respective bead portions 4 through a tread portion 2 that comes into contact with the ground and a pair of sidewall portions 3. The carcass 6 includes at least one carcass ply 6A (e.g. a single carcass ply in this embodiment) of carcass cords which are oriented at an angle of from 70 to 90 degrees with respect to the tyre circumferential direction, for example. The carcass ply 6A includes a main portion 6a extending between bead cores 4C and a pair of turned-up portions 6b each turned up around a respective one of the bead cores 4C.

In this embodiment, the tyre 1 includes a pair of buttress portions 5 each extending inwardly in the tyre radial direction from a respective one of tread edges 2t of the tread portion 2. The pair of buttress portions 5 is an outer region in the tyre radial direction of the pair of sidewall portions 3, and preferably means an outer region which is located outwardly in the tyre radial direction of the tyre maximum width position Pm. The tread edges 2t are the axial outermost edges of the ground contacting patch of the tyre 1 which occurs under the normal state of the tyre loaded with a standard tyre load when the camber angle of the tyre is zero.

As used herein, the standard tyre load is a tyre load officially approved or recommended for the tyre 1 by standards organizations, wherein the standard load is the "maximum load capacity" in JATMA, the maximum value given in the above-mentioned table in TRA or the like, and the "LOAD CAPACITY" in ETRTO.

Figure 2:
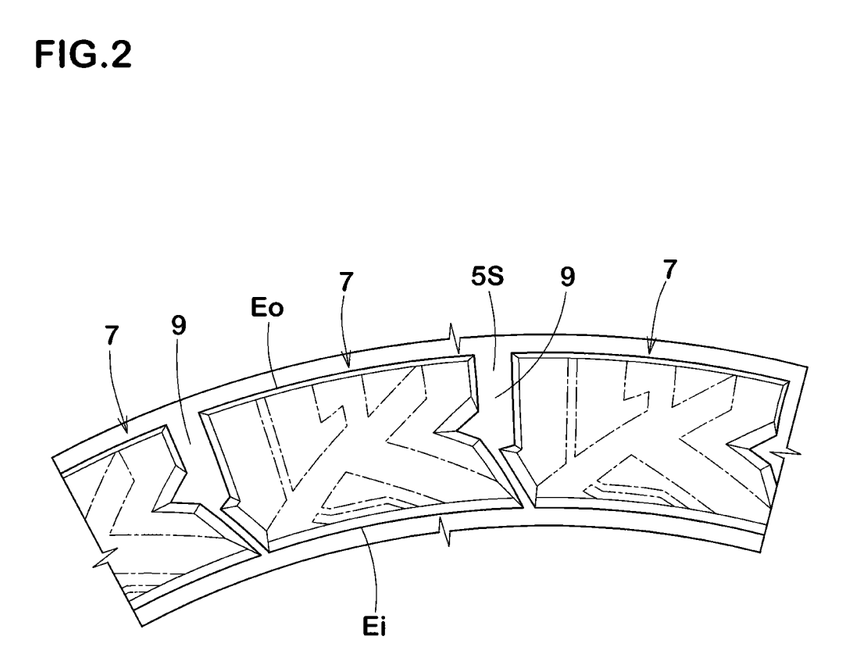
FIG. 2 is a side view showing a buttress portion conceptionally.

As illustrated in FIGS. 1 and 2, at least one of the pair of buttress portions 5 is provided with side protectors 7 which protrude outwardly in the tyre axial direction from an outer surface 5S of the buttress portion 5. The side protectors 7 are arranged in the tyre circumferential direction.

The side protectors 7 can prevent the sidewall portions from receiving cut damage due to contact with rocks and the like when off-road traveling. Further, when tyres travel in mud terrain, gaps 9 between adjacent side protectors 7 and 7 can shear mud, increasing traction in mud terrain. Preferably, the side protectors 7 are provided on both buttress portions 5.

Figure 3:
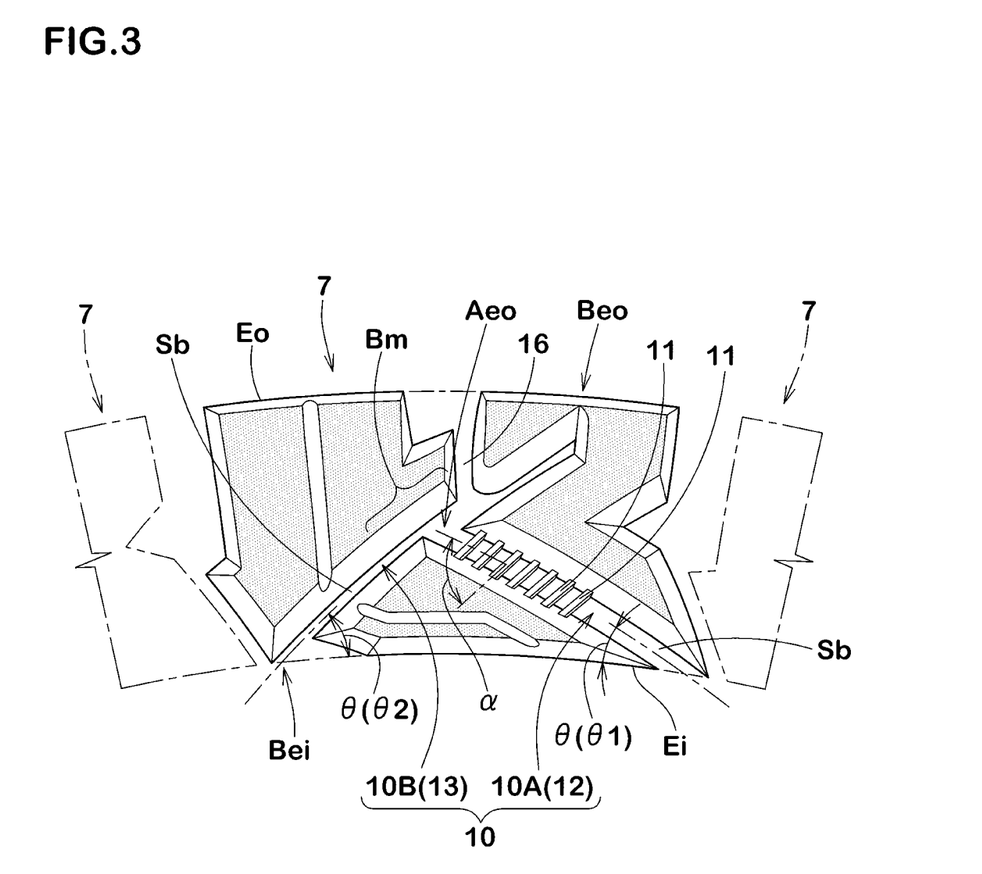
FIG. 3 is an enlarged side view of side protectors.

As illustrated in FIG. 3, one or more side protectors 7 are provided with one or more inclined grooves 10 inclined at an angle θ with respect to the tyre circumferential direction.

Groove depths D (shown in FIG. 5) of the inclined grooves 10 from outer surfaces 7S of the side protectors 7 are equal to or less than protruding heights H0 (shown in FIG. 1) of the side protectors 7 from the outer surface 5S of the buttress portions 5.

In this embodiment, the inclined grooves 10 include first inclined grooves 10A which extend outwardly in the tyre radial direction from innermost edges Ei of the side protectors 7 toward a first side (left in FIG. 3) in the tyre circumferential direction, and second inclined grooves 10B which extend outwardly in the tyre radial direction from the innermost edges Ei of the side protectors 7 toward a second side (right in FIG. 3) in the tyre circumferential direction. The angle θ of inclined grooves 10 may be constant. Alternatively, the angle θ may vary so as to increase and/or decrease, for example.

The inclined grooves 10 can deform in a direction so as to decrease the groove widths thereof when being received load in vertical direction, thus enabling to reduce stiffness of the side protectors 7, thereby improving ride comfort. This effect raises as the angle θ of the inclined grooves 10 becomes smaller. On the other hand, as the angle θ become smaller, there may be disadvantage such that stones, when traveling, tend to be in contact with groove bottoms Sb of the inclined grooves 10, thus causing cut damage easily.

In view of above, in the present disclosure, the inclined grooves 10 include one or more ribbed inclined grooves 12 which have groove bottoms Sb provided with a set of plurality of first ribs 11. In this embodiment, the plurality of first ribs 11 is arranged in parallel with each other. In this embodiment, the first inclined grooves 10A are configured as the ribbed inclined grooves 12.

The ribbed inclined grooves 12 can protect the groove bottoms Sb by the first ribs 11 while ensuring better ride comfort. Thus, even when the angles θ of inclination of the inclined grooves 10 are small, cut damage on the groove bottoms Sb can be suppressed.

That is, the ribbed inclined grooves 12 can improve ride comfort of tyres which are provided with side protectors 7 while maintaining high cut resistance. In order to improve such ability effectively, an angle θ1 of each ribbed inclined groove 12 is preferably in a range of from 20 to 40 degrees with respect to the tyre circumferential direction. When the angle θ1 exceeds 40 degrees, it may fail to fully be able to utilize the capability to improve ride comfort. When the angle θ1 is less than 20 degrees, the effect that suppresses cut damage tends to be deteriorated. Note that when the angle θ1 varies, it is preferable that an average angle of the angle θ1 (an average of the maximum and minimum angles) is preferably in a range of from 20 to 40 degrees. More preferably, both the maximum and minimum angles of the angle θ1 are in a range of from 20 to 40 degrees.

Figure 5:
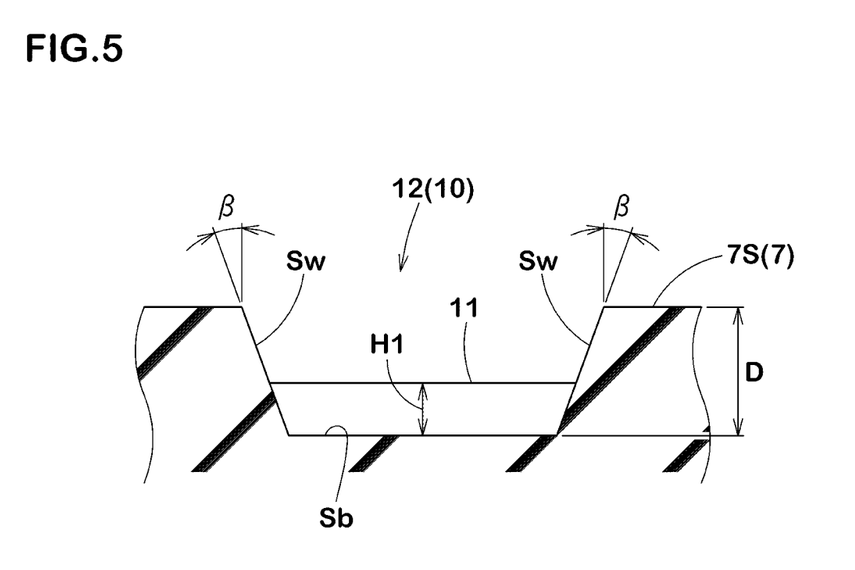
FIG. 5 is a cross-sectional view of a ribbed inclined groove perpendicular to a longitudinal direction of the ribbed inclined groove.

As illustrated in FIG. 5, the first ribs 11 extend between a pair of groove walls Sw and Sw of each ribbed inclined groove 12 so as to connect the pair of groove walls Sw. In view of the effect that suppresses cut damage, angles α (shown in FIG. 3) of the first ribs 11 with respect to a longitudinal direction of the ribbed inclined groove 12 are preferably in a range of from 60 to 90 degrees.

Figure 6:
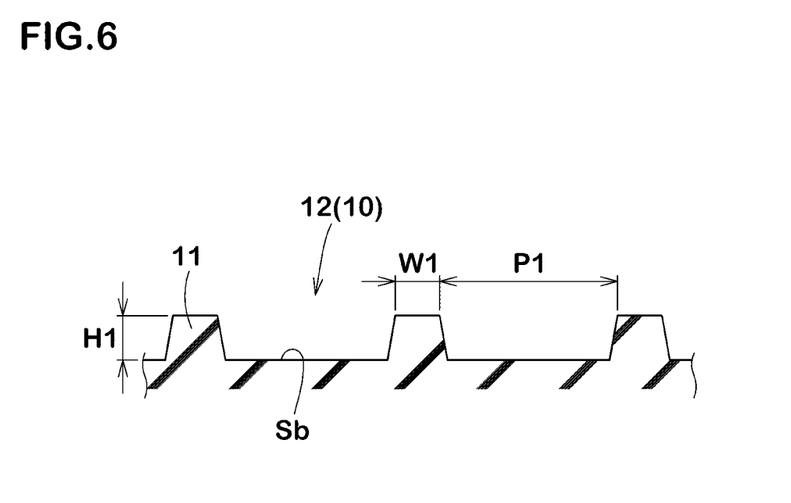
FIG. 6 is a cross-sectional view of first ribs perpendicular to a longitudinal direction of the first ribs.

As illustrated in FIG. 6, in the ribbed inclined grooves, it is preferable that a protruding height H1 of each first rib 11 is in a range of from 0.5 to 3.0 mm from the groove bottoms Sb. Further, it is preferable that a rib width W1 of each first rib 11 perpendicular to longitudinal direction thereof is in a range of from 0.5 to 2.5 mm, and a pitch P1 of adjacent first ribs 11 is in a range of from 1.5 to 5.5 mm. As a cross-sectional shape of the first ribs 11, a trapezoidal or rectangular shape is preferable in view of cut resistance. Note that the rib width W1 and the pitch P1 are measured on the top surface of each first rib 11.

When the protruding height H1 is less than 0.5 mm, cut suppressing effect may be deteriorated. On the other hand, when the protruding height H1 exceeds 3.0 mm, ride comfort may be deteriorated due to high stiffness of each first rib 11. Further, when the rib width W1 is less than 0.5 mm, cut suppressing effect may be deteriorated. On the other hand, when the rib width W1 exceeds 2.5 mm, ride comfort may be deteriorated due to high stiffness of each first rib 11. Furthermore, when the pitch P1 exceeds 5.5 mm, cut suppressing effect may be deteriorated. On the other hand, when the pitch P1 is less than 1.5 mm, ride comfort may be deteriorated due to high stiffness of each first rib 11.

As illustrated in FIG. 5, it is preferable that the protruding height H1 of each first rib 11 is equal to or less than 50% of the groove depth D of the inclined groove 10 on which the first rib is provided. Further, the groove depth D of each inclined groove 10 from the outer surface 5S of the buttress portion 5 is in a range of from 0.6 to 1.0 times the protruding height H0 (shown in FIG. 1) of the side protector 7 on which the inclined groove 10 is provided.

In a cross-section of each ribbed inclined groove 12 perpendicular to a longitudinal direction thereof, a pair of groove walls Sw of the ribbed inclined groove 12 is inclined at an angle β of from 20 to 60 degrees with respect to a normal line of an outer surface of the side protector on which the ribbed inclined groove 12 is provided.

When the angle β is less than 20 degrees, groove volume of the ribbed inclined groove 12 tends to increase, and it may cause situations where stones are in contact with the groove bottom Sb, deteriorating cut suppressing effect. On the other hand, the angle β exceeds 60 degrees, the groove volume tends to be small, and it may increase stiffness of the side protector, leading to poor ride comfort. In view of the above, the angle β is preferably equal to or more than 30 degrees, and preferably equal to or less than 50 degrees.

As illustrated in FIG. 3, in this embodiment, the inclined grooves 10 include one or more inclined grooves 13 which have no ribs on the groove bottoms Sb. In this embodiment, the second inclined grooves 10B are configured as the inclined groove with no ribs.

The inclined grooves 13, with respect to the tyre circumferential direction, each have an angle θ2 which is greater than the angle θ1 of each ribbed inclined groove 12. Satisfying the relationship of θ2>θ1 reduces situations where stones are in contact with and cut the groove bottom Sb of each inclined groove 13, thus enabling to maintain high cut resistance. Note that when the angle θ2 varies, an average angle of the angle θ2 (an average of the maximum and minimum) is preferably greater than the angle θ1.

The first inclined grooves 10A and the second inclined grooves 10B are different in inclination direction with respect to the tyre circumferential direction from one another. In this embodiment, outer ends Aeo in the tyre radial direction of respective first inclined grooves 10A are connected to middle portions Bm in the longitudinal direction of the respective second inclined grooves 10B so as to form a T-shaped junction. Each of the middle portions Bm is a region that is away from both inner end Bei and outer end Beo thereof at a 15% length (preferably, a 20% length) of an entire length of the second inclined groove 10B.

Even if cut damage occurs on the first inclined groove 10A, the cut damage growth can be suppressed since the outer ends Aeo of first inclined grooves 10A terminate at the second inclined groove 10B so as to form a T-shaped junction.

Figure 4:
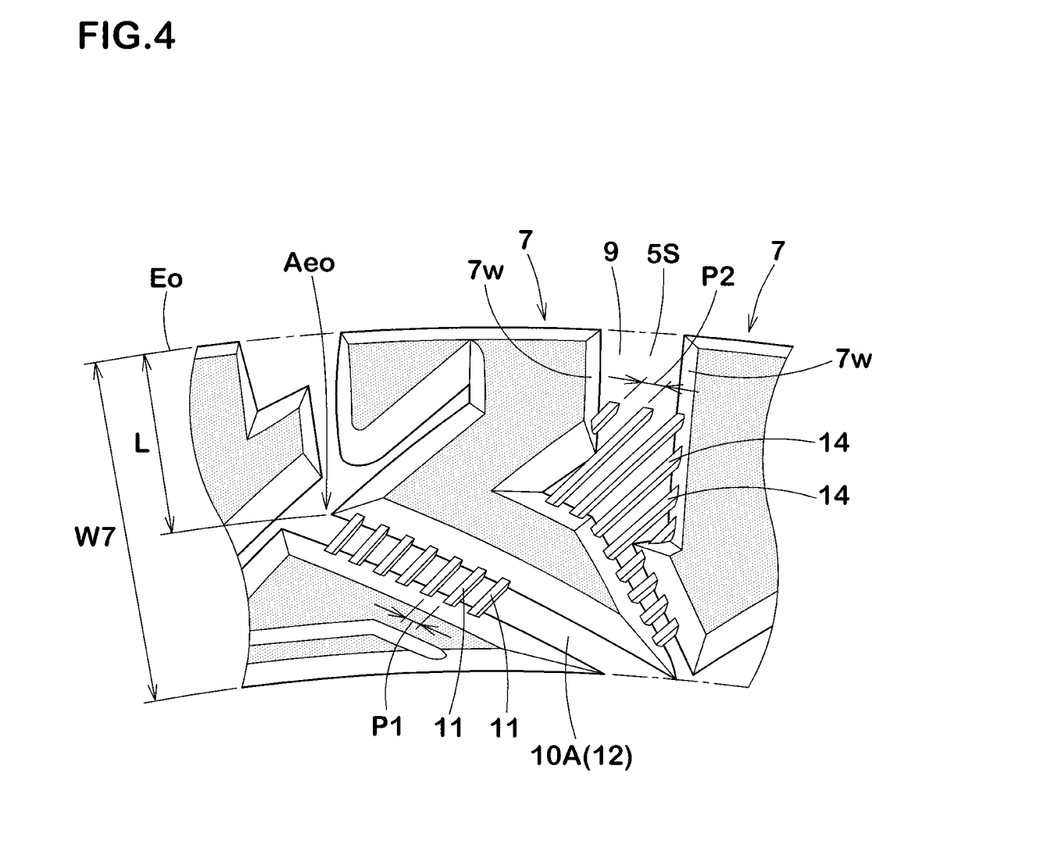
FIG. 4 is a side view showing gaps between adjacent side protectors.

As illustrated in FIG. 4, in this embodiment, a plurality of second ribs 14 is provided between adjacent side protectors 7 in the tyre circumferential direction on the outer surface 5S of the buttress portion 5. In this embodiment, some of the plurality of second ribs 14 extends so as to connect sidewalls 7w of adjacent side protectors 7 in the tyre circumferential direction. Note that the second ribs 14 are not illustrated in FIGS. 2 and 3 to make the basic structure of the side protectors 7 clear.

The plurality of second ribs 14 is inclined in the same direction as the first ribs 11 with respect to the tyre circumferential direction. The plurality of second ribs 14 can suppress cut damage by preventing stones from being in contact with the outer surface 5S of gaps 9 between adjacent side protectors 7. In the same reason as the first ribs 11, a protruding height H2 (not illustrated) of the plurality of second ribs 14 is preferably in a range of from 0.5 to 3.0 mm from the outer surface 5S, a rib width W2 (not illustrated) of the plurality of second ribs 14 perpendicular to a longitudinal direction thereof is preferably in a range of from 0.5 to 2.5 mm, and a pitch P2 of the plurality of second ribs 14 is preferably in a range of from 1.5 to 5.5 mm.

In particular, it is preferable that the plurality of second ribs 14 is arranged in parallel with the first ribs 11 with the same pitches (i.e., P1=P2).

As illustrated in FIG. 4, it is preferable that a distance L in the tyre radial direction between the outer end Aeo in the tyre radial direction of each ribbed inclined groove 12 and an outer edge Eo in the tyre radial direction of the side protector 7 is equal to or more than 40%, more preferably equal to or more than 50%, of a length W7 in the tyre radial direction of the side protector 7. Thus, the ribbed inclined groove 12 tends to have less situations to be in contact with stones when traveling since the ribbed inclined groove 12 is arranged away from the outer edge Eo which is located on a ground contact surface side, giving an advantage to cut resistance.

As illustrated in FIG. 3, in this embodiment, each side protector 7 is provided with an auxiliary groove 16 that extends from the second inclined groove 10B to the outer edge Eo in the tyre radial direction of the side protector 7. The auxiliary groove 16 increases an edge component in the tyre radial direction to improve traction performance in mud terrain. On the other hand, since the auxiliary groove 16 extends along the tyre radial direction, the auxiliary groove 16 has negligible impact on ride comfort as well as on cut resistance. Thus, the auxiliary groove 16 may be eliminated. Note that the phrase "extend along the tyre radial direction" shall include an aspect where the auxiliary groove 16 is inclined at an angle within 10 degrees with respect to the tyre radial direction.

In another aspect of tyre 1, the first ribs 11 may be provided on the second inclined grooves 10B such that the second inclined grooves 10B are configured as the ribbed inclined grooves 12. Further, as the inclined grooves 10, only the first inclined groove 10A (the ribbed inclined grooves 12) may be provided.

While the particularly preferable embodiments in accordance with the present disclosure have been described in detail, the present disclosure is not limited to the illustrated embodiments, but can be modified and carried out in various aspects.

Example

Tyres (size: 35×12.5 R20 LT) having a basic structure shown in FIG. 1 with side protectors shown in FIGS. 2 and 3 were prototyped based on the detail shown in Table 1. Then, cut resistance performance and ride comfort of each test tyres was tested.

In comparative examples and examples, the side protectors are provided with first inclined grooves and second inclined grooves (no auxiliary grooves), and are different only in the specification of the first inclined grooves as shown in Table 1. Further, in comparative examples and examples, all second inclined grooves are configured as inclined grooves with no ribs. Furthermore, in comparative example 1 (Ref 1), the side protectors are not provided with any first and second inclined grooves.

Cut Resistance Performance Test:

As to each set of test tyres, four tyres were mounted on a test vehicle (a four-wheel-drive vehicle having a displacement of 3500 cc) using rims (20×10 J) with internal pressure of 450 kPa. Then, a test driver drove the vehicle for 1,500 km on rocky roads covered with rocks and stones, and then the buttress portions of the test tyres in appearance were scored comprehensively based on the number, depths and lengths of cuts on the buttress portions. The test results are shown in Table 1 using a score system where Ref. 1 is set to 100. The larger value indicates better cut resistance performance.

Ride Comfort Test:

Using the same vehicle as above, a driver drove the vehicle on a test course of dry asphalt condition to evaluate ride comfort by driver's sense. The test results are shown in Table 1 using a score system where Ref. 1 is set to 100. The larger value indicates better ride comfort.

TABLE 1

| | Ref. 1 | Ref. 2 | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
|---|---|---|---|---|---|---|---|---|---|---|---|---|---|
| First inclined groove | none | presence | | | | | | | | | | | |
| Angles θ1 (deg.) | — | 30 | 20 | 40 | | | | | 30 | | | | |
| First ribs | none | none | presence | | | | | | | | | | |
| Protruding heights H1 (mm) | — | — | | | | 1.0 | | | | 0.5 | 3.0 | 1.0 | |
| rib widths W1 (mm) | — | — | 1.0 | | 0.5 | 2.5 | | | | 1.0 | | | |
| Pitches P1 (mm) | — | — | | 3.5 | | | | 1.5 | 5.5 | | 3.5 | | |
| Groove wall angles β (deg.) | — | | | | | 40 | | | | | | 20 | 60 |
| Second inclined grooves (no ribs) | none | presence | | | | | | | | | | | |
| Cut resistance performance | 100 | 80 | 97 | 95 | 100 | 95 | 100 | 100 | 95 | 95 | 100 | 100 | 95 |
| Ride comfort | 100 | 125 | 125 | 125 | 115 | 125 | 115 | 115 | 125 | 125 | 115 | 115 | 125 |
| (Comprehensive evaluation) | (200) | (205) | (222) | (220) | (215) | (220) | (215) | (215) | (220) | (220) | (215) | (225) | (220) |

As shown in Table 1, it is confirmed that the example tyres exhibit better ride comfort similar to the Ref. 2, while maintaining better cut resistance similar to the Ref. 1.

What is claimed is:

1. A pneumatic tyre comprising:
   a tread portion having a pair of tread edges; and
   a pair of buttress portions each extending inwardly in a tyre radial direction from a respective one of the tread edges, wherein
   at least one of the pair of buttress portions is provided with side protectors protruding outwardly in a tyre axial direction from an outer surface of the at least one of the pair of buttress portions and being arranged in a tyre circumferential direction,
   at least one of the side protectors is provided with one or more inclined grooves inclined with respect to the tyre circumferential direction,
   the inclined grooves comprise one or more ribbed inclined grooves which have groove bottoms provided with a set of plurality of first ribs,
   the inclined grooves comprise a first inclined groove and a second inclined groove which are different in inclination direction with respect to the tyre circumferential direction with each other, and
   the first inclined groove is one of the ribbed inclined grooves.

2. The pneumatic tyre according to claim 1, wherein the ribbed inclined grooves have angles θ1 of from 20 to 40 degrees with respect to the tyre circumferential direction.

3. The pneumatic tyre according to claim 1, wherein in the ribbed inclined grooves, a protruding height of the plurality of first ribs is in a range of from 0.5 to 3.0 mm from the groove bottoms, a rib width of the plurality of first ribs perpendicular to longitudinal direction thereof is in a range of from 0.5 to 2.5 mm, and a pitch of the plurality of first ribs is in a range of from 1.5 to 5.5 mm.

4. The pneumatic tyre according to claim 1, wherein the ribbed inclined grooves each have a pair of groove walls, and the plurality of first ribs connects the pair of groove walls.

5. The pneumatic tyre according to claim 1, wherein in a cross-section of each ribbed inclined groove perpendicular to a longitudinal direction thereof, the ribbed inclined groove has a pair of groove walls which is inclined at an angle of from 20 to 60 degrees with respect to a normal line of an outer surface of the at least one of the side protectors.

6. The pneumatic tyre according to claim 1, wherein the second inclined groove has no ribs in a groove bottom thereof.

7. The pneumatic tyre according to claim 6, wherein with respect to the tyre circumferential direction, the second inclined groove, has an angle θ2 greater than an angle θ1 of the first inclined groove.

8. The pneumatic tyre according to claim 6, wherein the at least one of the side protectors is provided with an auxiliary groove that extends from the second inclined groove to an outer edge in the tyre radial direction of the at least one of the side protectors.

9. The pneumatic tyre according to claim 1, wherein an outer end in the tyre radial direction of the first inclined groove is connected to a middle portion in a longitudinal direction of the second inclined groove so as to form a T-shaped junction.

10. The pneumatic tyre according to claim 9, wherein the at least one of the side protectors is provided with an auxiliary groove that extends from the second inclined groove to an outer edge in the tyre radial direction of the at least one of the side protectors.

11. The pneumatic tyre according to claim 1, wherein the plurality of first ribs is arranged in parallel with each other.

12. The pneumatic tyre according to claim 11, wherein an angle of the plurality of first ribs is in a range of from 60 to 90 degrees with respect to a longitudinal direction of the ribbed inclined groove 12 on which the plurality of first ribs is provided.

13. The pneumatic tyre according to claim 1, wherein an angle of the plurality of first ribs is in a range of from 60 to 90 degrees with respect to a longitudinal direction of the ribbed inclined groove 12 on which the plurality of first ribs is provided.

14. The pneumatic tyre according to claim 1, wherein
in a cross-sectional perpendicular to a longitudinal direction of the plurality of first ribs, the plurality of first ribs has a trapezoidal or rectangular shape.

15. The pneumatic tyre according to claim 1, wherein
a distance in the tyre radial direction between an outer end in the tyre radial direction of each ribbed inclined groove and an outer edge in the tyre radial direction of the at least one of the side protectors is equal to or more than 40% of a length in the tyre radial direction of the at least one of the side protectors.

16. The pneumatic tyre according to claim 1, wherein
the at least one of the side protectors is provided with an auxiliary groove that extends from the second inclined groove to an outer edge in the tyre radial direction of the at least one of the side protectors.

17. A pneumatic tyre comprising:
a tread portion having a pair of tread edges; and
a pair of buttress portions each extending inwardly in a tyre radial direction from a respective one of the tread edges, wherein
at least one of the pair of buttress portions is provided with side protectors protruding outwardly in a tyre axial direction from an outer surface of the at least one of the pair of buttress portions and being arranged in a tyre circumferential direction,
at least one of the side protectors is provided with one or more inclined grooves inclined with respect to the tyre circumferential direction,
the inclined grooves comprise one or more ribbed inclined grooves which have groove bottoms provided with a set of plurality of first ribs,
the outer surface of the at least one of the pair of buttress portions being further provided with a plurality of second ribs connecting side protectors arranged adjacently in the tyre circumferential direction, and
the plurality of second ribs are inclined in a same direction as the first ribs with respect to the tyre circumferential direction.

18. The pneumatic tyre according to claim 17, wherein
the plurality of second ribs extends in parallel with the plurality of first ribs.

19. The pneumatic tyre according to claim 18, wherein
a pitch of the plurality of second ribs is same as a pitch of the plurality of first ribs.

* * * * *